United States Patent [19]

Chen

[11] Patent Number: 5,426,816
[45] Date of Patent: Jun. 27, 1995

[54] FREEWHEEL GEAR CLUSTER CLEANER

[75] Inventor: Liu Chen, Taichung, Taiwan

[73] Assignee: Lu Goo Co., Ltd., Changhua, Taiwan

[21] Appl. No.: 252,643

[22] Filed: Jun. 1, 1994

Related U.S. Application Data

[63] Continuation-in-part of Ser. No. 133,285, Oct. 8, 1993, Pat. No. 5,343,588.

[51] Int. Cl.⁶ ............................................. A46B 15/00
[52] U.S. Cl. .................................. 15/256.5; 280/158.1
[58] Field of Search .................... 15/256.5; 280/152.1, 280/158.1; 474/92

[56] References Cited

U.S. PATENT DOCUMENTS

| | | | |
|---|---|---|---|
| 719,608 | 2/1903 | Peterson | 280/158.1 |
| 4,955,850 | 9/1990 | Lee | 15/256.5 X |

FOREIGN PATENT DOCUMENTS 32391 of 1910 United Kingdom ............. 280/158.1

Primary Examiner—Christopher K. Moore
Attorney, Agent, or Firm—Beveridge, DeGrandi, Weilacher & Young

[57] ABSTRACT

A freewheel gear cluster cleaner for cleaning the freewheel gear cluster of a bicycle, including a first clamping plate and a second clamping plate pivotally connected to the first clamping plate by a pivot pin and fixed with the first clamping plate to the chain stay of a bicycle by a screw, a brush holder having a ball head rod fixed to the first clamping plate between two jaw plates thereof by a screw and a brush coupling portion with a series of steps, and a plurality of brush members respectively fastened to the steps of the brush coupling portion to hold a respective bunch of bristles permitting the respective bunch of bristles to be disposed in contact with either gear wheel of the freewheel gear cluster.

1 Claim, 3 Drawing Sheets

FREEWHEEL GEAR CLUSTER CLEANER

This application is a continuation-in-part of parent application Ser. No. 08/133,285 filed Oct. 8, 1993, now U.S. Pat. No. 5,343,588, issued Sep. 6, 1994.

BACKGROUND OF THE INVENTION

The present invention relates to a bicycle freewheel gear cluster cleaner fastened to the chain stay of a bicycle to clean the gear wheels of the freewheel gear cluster automatically during the running of the bicycle.

Bicycles have been widely accepted nowadays for use as transportation vehicles as well as sports apparatus. Regular bicycles for sports and recreation commonly have the function of speed changes through the operation of a freewheel gear cluster. The gear wheels of the freewheel gear cluster of a bicycle must be regularly cleaned so as to prevent the chain from being stuck in the freewheel gear cluster. Because a bicycle's freewheel gear cluster consists of various gear wheels, it is not an easy job to clean the the freewheel gear cluster of a bicycle.

SUMMARY OF THE INVENTION

The present invention has been accomplished to provide a freewheel gear cluster cleaner for a bicycle which automatically removes dirt from the gear wheels of the freewheel gear cluster of the bicycle as the bicycle is moving.

According to one aspect of the present invention, the frail gear cluster cleaner comprises a first clamping plate and a second clamping plate pivotally connected to the first clamping plate by a pivot pin and fixed with the first clamping plate to the chain stay of a bicycle by a screw, a brush holder having a ball head rod fixed to the first clamping plate between two jaw plates thereof by a screw and a brush coupling portion with a series of steps, and a plurality of brush members respectively fastened to the steps of the brush coupling portion to hold a respective bunch of bristles permitting the respective bunch of bristles to be disposed in contact with either gear wheel of the freewheel gear cluster. Therefore, when the bicycle is moving, the bunches of bristles of the brush members automatically whip off dirt from the freewheel gear cluster of the bicycle.

According to another aspect of the present invention, each step of the stepped brush coupling portion defines a stepped through hole for mounting either brush member; each brush member comprises a stepped rod plugged into the stepped through hole on either step of the stepped brush coupling portion to hold a bunch of bristles. Because the brush members are fastened to the stepped brush coupling portion of the brush holder by fitting the respective stepped rod into the stepped through hole on either step of the stepped brush coupling portion, they can be conveniently replaced when the bristles are damaged by use.

BRIEF DESCRIPTION OF THE DRAWINGS

The present invention will now be described by way of example with reference to the annexed drawings, in which:

FIG. 2A shows a brush member fastened to the brush holder of the freewheel gear cluster cleaner according to the present invention.

DETAILED DESCRIPTION OF THE PREFERRED EMBODIMENT

Figure 1:
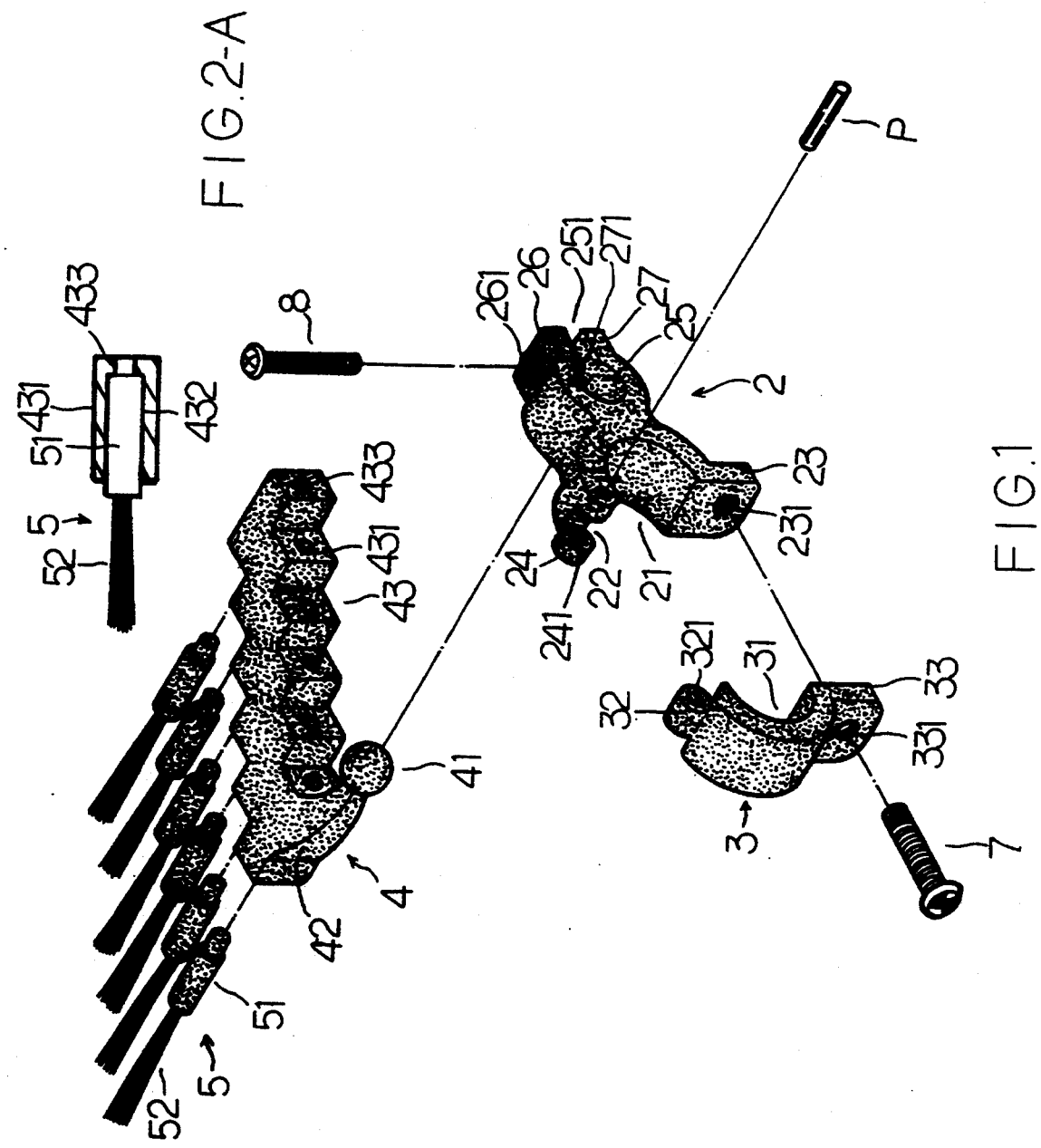
FIG. 1 is an exploded view of a freewheel gear cluster cleaner according to the preferred embodiment of the present invention.
Figure 2:
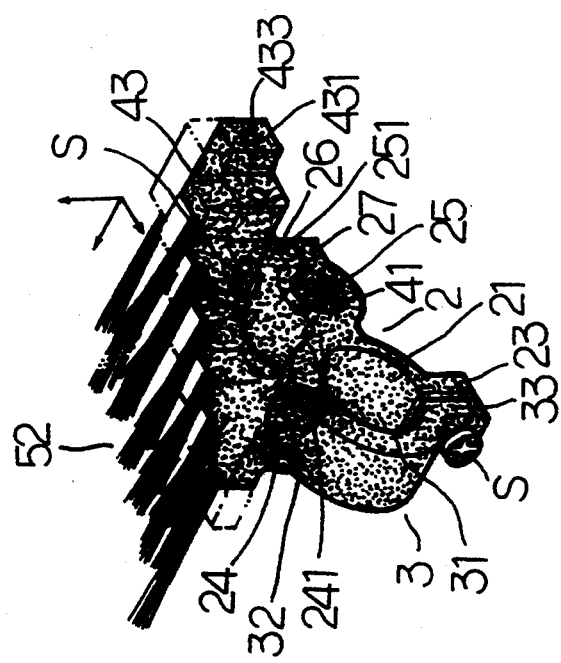
FIG. 2 is an assembly view of the freewheel gear cluster cleaner shown in FIG. 1.

Referring to FIG. 1, a freewheel gear cluster cleaner in accordance with the present invention is generally comprised of first clamping plate 2, a second clamping plate 3, and a brush holder 4, and a plurality of brush members 5. The first clamping plate 2 comprises an arched mounting portion 21 at one end and a brush coupling portion 25 at an opposite end. The arched mounting portion 21 has one end terminating in two barrels 24 spaced by an opening 22, and an opposite end terminating in a flat extension plate 23 with a screw hole 231. The barrels 24 of the arched mounting portion 21 of the first clamping plate 2 define a respective through hole 241 longitudinally aligned. The brush coupling portion 25 comprises an upper jaw plate 26 and a lower jaw plate 27 spaced by a mouth 251. The upper jaw plate 26 has a through hole 261. The lower jaw plate 27 has a screw hole 271 in line with the through hole 261 on the upper jaw plate 26. The second clamping plate 3 comprises an arched mounting portion 31 having one end terminating in a barrel 32 with a through hole 321 and an opposite end terminating in a flat extension plate 33 with a through hole 331. The barrel 32 of the arched mounting portion 31 of the second clamping plate 3 is inserted into the opening 22 and connected between the barrels 24 of the arched mounting portion 21 of the first clamping plate 2 by a pin P, which inserts through the through holes 321 and 241. Therefore, the first and second clamping plates 2 and 3 are pivotally connected together. By mounting the arched mounting portions 21 and 31 around the bicycle's chain stay 6 and then threading a screw 7 through the through hole 331 into the screw hole 231, the first and second clamping plates 2 and 3 are fixed to the bicycle's chain stay 6. The brush holder 4 comprises a ball head rod 41 fastened to the first clamping plate 2 between the upper and lower jaw plates 26 and 27 by a screw 8, which is threaded through the through hole 261 into the screw hole 271, a stepped brush coupling portion 43 perpendicularly extended from the root 42 of the ball head rod 41 for holding the brush members 5. The stepped brush coupling portion 43 comprises a series of steps 431 having each stepped hole formed of a plug hole 432 and a circular through hole 433 concentrically disposed within the plug hole 432. Each brush member 5 comprises a stepped mounting rod 51 fitted into either stepped hole 432 and 433 (see FIG. 2A), and a bunch of bristles 52 of suitable flexibility and resilience fastened to the the stepped mounting rod 51 at one end.

Figure 3:
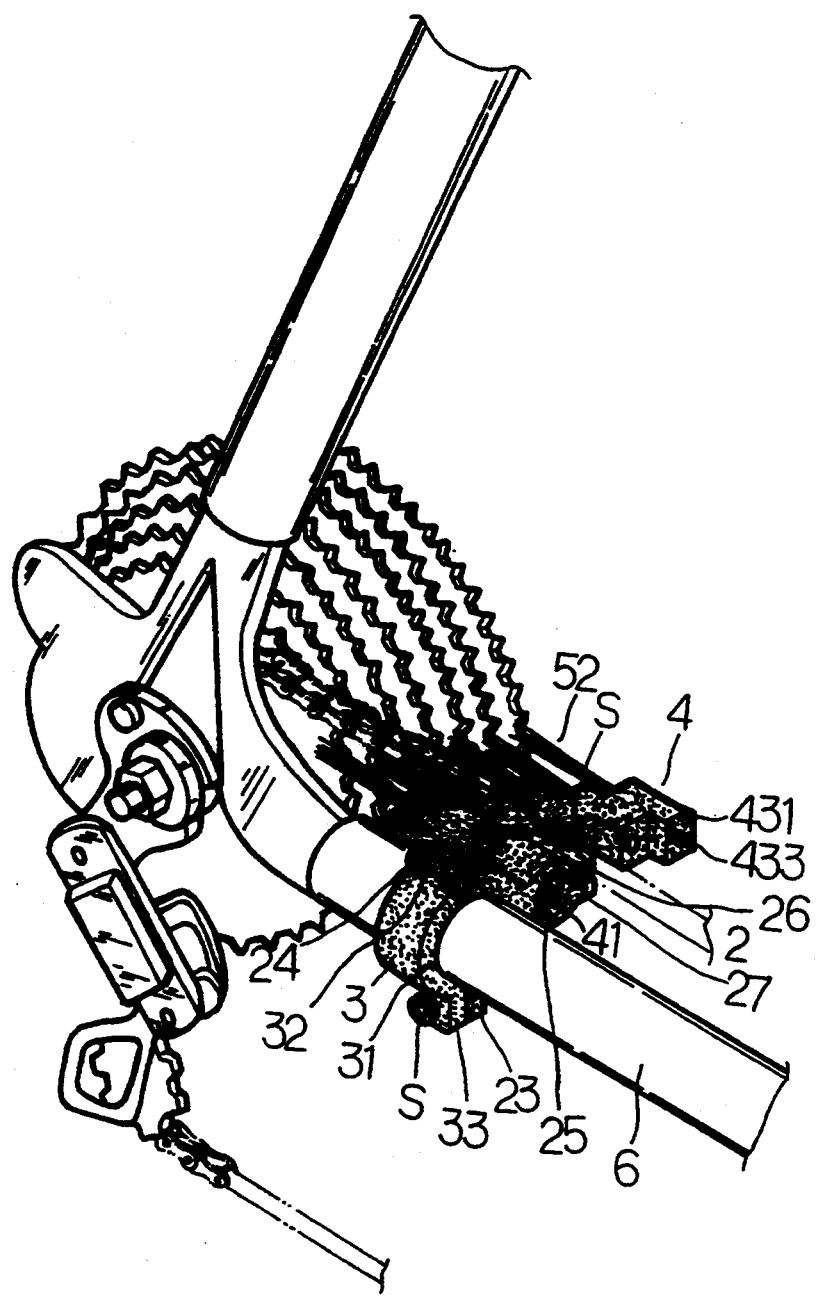
FIG. 3 is an installed view showing the freewheel gear cluster cleaner fastened to a bicycle's chain stay.

Referring to FIG. 3, when the first and second clamping plates 2 and 3 are pivotally connected together by the pin P and fixed to the chain stay 6 by the screw 7, the ball head rod 41 is inserted in between the upper and lower jaw plates 26 and 27 of the brush coupling portion 25 of the first clamping plate 2 and turned to the desired angle, and then the screw 8 is fastened is threaded through the through hole 261 on the upper jaw plate 26 into the screw hole 271 on the lower jaw plate 27 to close the mouth 251, and therefore the brush holder 4 is fixed to the brush coupling portion 25 of the first clamping plate 2 at the desired angle. When installed, the bristles 52 of the brush members 5 are respectively disposed in contact with the gear wheels of the freewheel gear cluster of the bicycle. As the freewheel gear cluster is rotated, dirt is removed from the gear wheels of the freewheel gear cluster by the bristles 52 of the brush members 5.

What is claimed is:

1. A freewheel gear cluster cleaner comprising:

a clamping plate unit fastened to the chain stay of a bicycle, said clamping plate unit comprising a first clamping plate and a second clamping plate connected together around the chain stay, said first clamping plate comprising an arched mounting portion at one end mounted on the chain stay, and a brush coupling portion at an opposite end, the arched mounting portion of said first clamping plate having two spaced barrels longitudinally aligned at one end and a flat extension plate with a screw hole at an opposite end, said brush coupling portion comprising an upper jaw plate and a lower jaw plate spaced by a mouth, said lower jaw plate having a screw hole, said upper jaw plate having a through hole connected to the screw hole on said lower jaw plate by a screw, said second clamping plate comprising an arched mounting portion having a barrel at one end and a flat extension plate at an opposite end, the barrel of said second clamping plate being pivotally connected between the two barrels of the arched mounting portion of said first clamping plate by a pivot pin, the flat extension plate of the arched mounting portion of said second clamping plate having a through hole connected to the screw hole on the flat extension plate of the arched mounting portion of said first clamping plate by a screw;

a brush holder fastened to said brush coupling portion of said first clamping plate, said brush holder comprising a ball head rod fastened to said first clamping plate between said upper and lower jaw plates, a stepped brush coupling portion perpendicularly extended from said ball head rod, said stepped brush coupling portion comprising a series of steps, each step having a stepped through hole; and a plurality of brush members respectively fastened to the stepped brush coupling portion of said brush holder, each brush member comprising a stepped mounting rod fitted into the stepped through hole on either step of said stepped brush coupling portion, and a bunch of bristles fastened to the stepped mounting rod and disposed in contact with either gear wheel of the freewheel gear cluster of the bicycle.

* * * * *